United States Patent [19]

Schapira et al.

[11] Patent Number: 5,472,476

[45] Date of Patent: Dec. 5, 1995

[54] ANTICLUMPING COMPOSITION AND ANTICLUMPING PROCESS FOR FERTILIZERS

[75] Inventors: Joseph Schapira, Paris; Jean-Claude Cheminaud, Herblay; Pascal Petitbon, Gennevilliers; Dominique Imbert, Courbevoie, all of France

[73] Assignee: CFPI, Gennevilliers, France

[21] Appl. No.: 197,491

[22] Filed: Feb. 16, 1994

[30] Foreign Application Priority Data

Feb. 16, 1993 [FR] France ................... 93 01723

[51] Int. Cl.⁶ .................................. C05G 3/10
[52] U.S. Cl. .................. 71/64.12; 71/64.13; 106/213; 252/49.5
[58] Field of Search ............... 71/64.07, 64.12, 71/64.13, 252, 49.5; 106/213

[56] References Cited

U.S. PATENT DOCUMENTS 3,235,627  2/1966  Mansfield .................. 558/110
3,388,990  6/1968  Maruta et al. ............... 71/64.07

FOREIGN PATENT DOCUMENTS 661598    7/1965   Belgium .
0341102   11/1989  European Pat. Off. .
2460706   1/1981   France .

OTHER PUBLICATIONS pp. 358–361, vol. 22, third edition of "Kirk–Othmer Encyclopedia Of Chemical Technology" 1983 (No Month).

Publication "Organic Phosphorous Compounds", vol. 6, pp. 220–230 by G. M. Kosolapoff and L. Maier (No Month).

Primary Examiner—Ferris Lander
Attorney, Agent, or Firm—Larson and Taylor

[57] ABSTRACT

Anticlumping composition intended for fertilizers comprising an aqueous solution of at least one surfactive agent and at least one high molecular weight polymer soluble in the said aqueous solution, wherein the surfactive agent is consisting of a phosphoric ester acid salt.

8 Claims, 1 Drawing Sheet

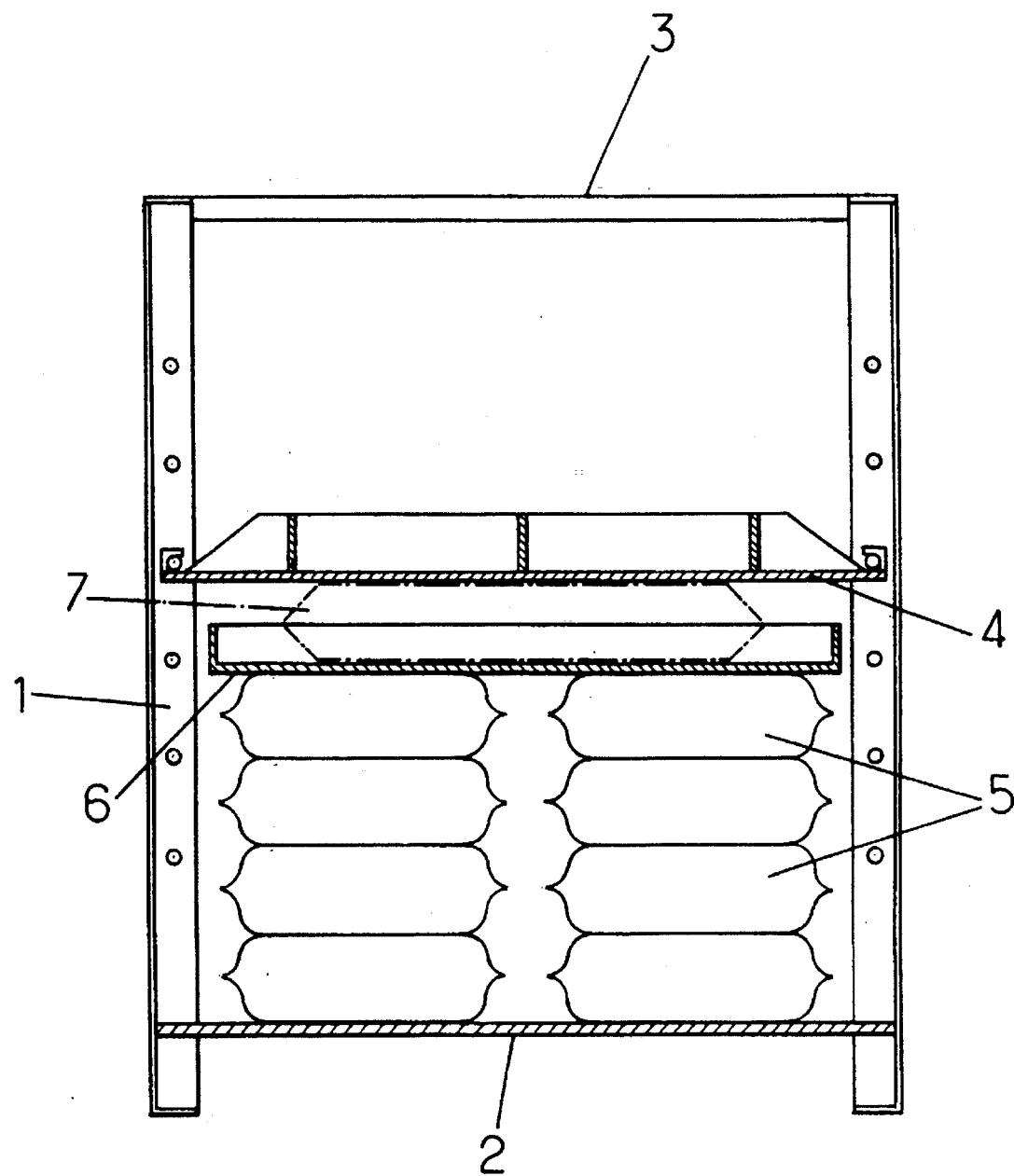

ANTICLUMPING COMPOSITION AND ANTICLUMPING PROCESS FOR FERTILIZERS

The invention relates to an anticlumping composition and an anticlumping process intended for the fertilizers of the group comprising especially urea and, more generally, ammonium nitrate, sulfate, chloride and phosphates, potassium chloride, calcium superphosphate and the mixtures of these products.

Anticlumping compositions intended for fertilizers and comprising a surfactive agent as well as a high molecular weight polymer soluble in water or in the aqueous solution of the surfactive agent, are well known.

Anticlumping compositions of this kind are disclosed in the american patent U.S. Pat. No. 3,388,990 according to which the surfactive agent is consisting essentially of sodium dodecylsulfate, sodium dodecylbenzene-sulfonate, sodium butylnaphthalene-sulfonate, fatty acids salts, resinous acids soaps, salts of monoalkylsulfates, salts of alkylbenzene and alkylaphthalene sulfonic acids, salts of olefin-sulfonic acids, salts of dialkyl-sulfosuccinic acids and salts of polyethoxyl-sulfates, the water soluble polymers are consisting essentially of polyvinyl alcohols and their acetals, polyvinyl acetate and propionate, polyvinyl-pyrrolidone, polyacrylic acid and its salts, polyacrylamide, polymethacrylic acid and its salts, the water soluble resins of the type ureaformaldehyde and melamine-formaldehyde, polyethyleneglycols, methyl- and carboxymethyl-celluloses.

Due to the always increasing requirements of the consumers, the object of the Applicants was to prepare anticlumping compositions of the kind in question which present higher performances than those already existing.

And they had the merit of having found that a particularly impressive anticlumping effect is obtained when using in the said compositions, as surfactive agent, at least one phosphoric ester-acid salt, being recalled that the expression phosphoric ester acid means the result of the reaction of $P_2O_5$, of the mixture of $P_2O_5+H_3PO_4$, of $POCl_3$ or $PCl_5$ with at least one compound comprising hydroxyl groups, in particular with at least one alcohol (see in that respect especially the book "Organic Phosphorous Compounds", Volume 6, page 222 and following, by G. M. Kosolapoff and L. Maier).

By way of consequence, the anticlumping composition intended for fertilizers according to the invention which comprises an aqueous solution of at least one surfactive agent and at least one high molecular weight polymer soluble in the said aqueous solution, is characterized by the fact that the surfactive agent is consisting of a phosphoric ester acid salt.

According to an advantageous embodiment of the abovesaid anticlumping composition, the phosphoric ester acid is selected from the group comprising alkylphosphoric acids possibly ethoxylated, the mixtures of mono- and of diesters being preferred.

According to another advantageous embodiment of the abovesaid anticlumping composition, the phosphoric ester acid is selected from the group consisting of the polymers of alkylene oxides whose free hydroxyl functions are at least partially phosphated.

According to another advantageous embodiment of the abovesaid anticlumping composition, the phosphoric ester acid is used in the form of an alkaline metal salt, of an ammonium, amine or alkanolamine salt, the three last enumerated types being preferred.

According to another advantageous embodiment of the abovesaid anticlumping composition, the high molecular weight polymer which is soluble in the solution of the surfactive agent is selected from the group comprising polyvinyl alcohols, polyvinylpyrrolidones, urea-formaldehyde resin, polyethyleneglycol, the derivatives of cellulose among which carboxymethylcellulose, polycarboxylic acids and their salts, polyacrylamides, polyvinylsulfonic acid and its salts, polyvinylmethylic ether, copolymers of maleic acid and of acrylic acid, copolymers of methacrylic acid or of acrylamide, ether-methylvinylic copolymers, copolymers of vinylpyrrolidone and of vinyl acetate or acrylamide.

According to another advantageous embodiment of the abovesaid anticlumping composition, the weight ratio between the polymer and the surfactive agent is from 1/10 to 10/1, preferably from 1/10 to 5/1 and still more preferably from 1/10 to 1/2.

According to another advantageous embodiment of the abovesaid anticlumping composition, the latter is as much concentrated as possible as far as the polymer and as far as the surfactive agent are concerned, the said concentration being especially from 5 to 50% by weight, preferably from 20 to 50% by weight.

In order to prepare the anticlumping composition according to the invention, it is possible to solubilize the high molecular weight polymer directly in an aqueous concentrated solution of the surfactive agent under heating if necessary.

The anticlumping process according to the invention is characterized by the fact that there is applied on the particles of the fertilizer to be treated either the composition according to the invention, or simultaneously but separately from one another the polymer and the surfactive agent which are the constituents of the said composition.

According to an advantageous embodiment of the anticlumping process according to the invention, the anticlumping composition according to the invention is applied to the particles of the fertilizer to be treated in an amount which is sufficient to provide an amount of dry matter of the polymer and of the surfactive agent which represents, with respect to the dry matter of the fertilizer, a proportion from 0.001 to 0.5%, preferably from 0.005 to 0.05% and, still more preferably, from 0.005 to 0.02% by weight.

According to another advantageous embodiment of the abovesaid process, the composition according to the invention is applied on the fertilizer by spraying, its temperature being advantageously from 20° to 50° C., the temperature of the said fertilizer which preferably presents at the moment of the application of the composition almost the totality of its final properties and which is at that moment on a transporting belt or, preferably, on a coating drum, being advantageously from 20° to 65° C.

Another object of the invention is the novel industrial product consisting of a fertilizer of the group comprising in particular urea and, more generally, ammonium nitrate, sulfate, chloride and phosphates, potassium chloride, calcium superphosphate and the mixtures of these products, the said fertilizer being characterized by the fact that its constitutive particles comprise a coating consisting of the constituents of the composition according to the invention.

The invention will be still better understood by way of the following non limiting examples which disclose advantageous embodiments of the invention.

EXAMPLE 1

An anticlumping composition according to the invention (composition A) and two prior art anticlumping compositions (compositions B and C) are prepared.

In the three cases, the high molecular weight polymer is consisting of polyvinyl alcohol PVA obtained by hydrolysis (hydrolysis grade equal to 83%) from the corresponding polyvinyl acetate.

The surfactive agent is consisting of ammonium n-hexylphosphate, as far as composition A is concerned, of respectively sodium laurylsulfate and sodium isopropyl-naphthalenesulfonate, as far as compositions B and C are concerned.

The ammonium n-hexylphosphate is prepared by reacting phosphoric anhydride with n-hexanol in a ratio alcohol/P of 3/2, i.e. 3 alcohol moles for 1 $P_2O_5$ mole.

In each one of the three compositions, the content in PVA is equal to 4% by weight (dry matter), in surfactive agent is equal to 22% (dry matter).

Compositions A, B and C are consequently identified as follows:

composition A: PVA/ammonium n-hexylphosphate (3/2)

composition B: PVA/sodium laurylsulfate composition C: PVA/sodium isopropyl-naphthalenesulfonate.

Compositions A, B and C are used in an anticlumping treatment of a fertilizer consisting of prilled urea.

In that respect, the three compositions are successively sprayed, inside concrete mixing machine, on three distinctive batches of 10 kg of the said urea; an amount of 0.05% by weight of each of the compositions A, B and C is used, the said amount being taken with respect to the urea and providing an amount of dry matter of polymer and of surfactive agent which represents a proportion of 0.13% by weight with respect to the dry matter of the urea.

In order to evaluate the result of the abovesaid anticlumping treatment, procedure is as follows.

The three batches of 10 kg of urea treated respectively with one of the compositions A, B and C are introduced respectively in polyethylene bags which are stacked or piled up in a clumping device of the type shown on the single drawing.

BRIEF DESCRIPTION OF THE DRAWINGS

The single drawing shows a clumping device in which bags filled with fertilizer are stacked so as to characterize clumping of a given product.

The abovesaid clumping device comprises a frame consisting of pillars or columns 1, of a loading platform 2, of spacing elements 3 and of a fix platform 4.

The polyethylene bags 5, filled with the product to be tested, are stacked on a loading platform 2 as shown.

A platform 6 bearing a lifting cushion 7 is placed on the pile of bags. When inflating, the cushion with compressed air between the movable platform 6 and the fix platform 4, a pressure is applied on the pile of bags.

That pressure is changeable and can simulate a pile of bags of a height of 12 m.

The fertilizer is maintained under pressure during a variable duration, generally from 10 to 45 days, sometimes of several months.

In the present case, the pressure applied is 0.6 kg/cm$^2$.

The temperature of the experimentation is the ambient temperature and the duration is 10 days.

At the end of that period of 10 days, the bags are opened and the degree of clumping is determined by evaluation of the hardness of the clumps using a dynamometer. Generally, the hardness of the clumps is comprised between 0 and 100 N (Newton) but can reach 200 N in the case of the non treated controls. The lower the hardness, the lower the degree of agglomeration or clumping.

In the present case, the recorded values with respect to the hardness of the clumps (average of 4 determinations) is:

as far as composition A (invention) is concerned: 0 as far as composition B (prior art) is concerned: 49 N as far as composition C (prior art) is concerned: 23 N.

In the case of a control (no anticlumping treatment), the recorded value is higher than 150 N.

The superiority of the composition according to the invention clearly appears from the comparison of these values.

EXAMPLE 2

Examination of the Influence of the Degree of Esterification

Composition A is used again.

The fertilizer is consisting of prilled urea.

Three further compositions according to the invention and denoted D, E and F are prepared using the same polymer (PVA of example 1) according to the same proportions, but using three surfactive agents which are different (the proportion being the proportion used for composition A), i.e.:

ammonium n-hexylphosphate prepared starting from $P_2O_5$ and alcohol, the weight ratio alcohol/P being 3/1 (composition D), ammonium n-butyl-n-hexylphosphate prepared starting from $P_2O_5$ and from a mixture 50/50 by weight of the two alcohols; in a first case, the ratio alcohol/P is 3/2 (composition E) and, in a second case, it is 3/1 (composition F).

Compositions D, E and F are identified as follows:

composition D: PVA/n-hexylphosphate of $NH_4$ (3/1)

composition E: PVA/n-butyl-n-hexylphosphate of $NH_4$ (3/2)

composition F: PVA/n-butyl-n-hexylphosphate of $NH_4$ (3/1).

Compositions B and C are used as prior art compositions.

An amount of each of the compositions A, D, E and F analogous to the amount indicated in example 1 is used; the proportion of dry matter of polymer and of surfactive agent is again 0.013% with respect to the dry matter of the urea.

The result of each of these anticlumping treatments is determined proceeding in the same way as in example 1, excepted the pressure which is maintained during 20 days.

The hardness of the clumps is determined in the same way as indicated in example 1 and the results are:

| composition A | 18 N |
|---|---|
| composition B | 90 N |
| composition C | 72 N |
| composition D | 25 N |
| composition E | 23 N |
| composition F | 49 N |
| control | >150 N. |

The examination of these values shows that, with respect to the prior art, the results recorded when using the compositions according to the invention are always higher even if different degrees of esterification are used.

EXAMPLE 3

Examination of the Influence of the Neutralizing Agent.

Composition D of example 2 is used again and two compositions according to the invention, respectively G and H, are prepared, these compositions being different from composition D by the fact that the neutralizing agent of the phosphoric ester acid is instead of $NH_4OH$ (composition D), sodium hydroxide (composition G) and monoethanolamine (composition H).

Compositions D, G and H are applied on a fertilizer consisting of prilled urea.

The amount of dry matter of surfactive agent and of polymer is still equal to 0.013% by weight with respect to the dry matter of the urea.

The anticlumping results of compositions D, G and H are determined in the same way as in example 2 and the recorded values of the hardness of the clumps are:

| composition D | 25 N |
| composition G | 49 N |
| composition H | 8 N |
| control | >150 N. |

The examination of these results shows that it is advantageous to use, as neutralizing agent of the phosphoric ester acid, ammonia and more especially an alkanolamine, preferably monoethanolamine.

EXAMPLE 4

Examination of the Influence of the Amount of the Anticlumping Composition Used

An anticlumping composition K according to the invention is prepared, this composition being different from composition E by the fact that the surfactive agent is prepared starting from $P_2O_5$ and from equal quantities of n-butanol and of 2-ethyl-hexanol according to the ratio alcohol/P equal to 3/2.

Furthermore, composition E is used again and the influence of the amount of anticlumping composition used is determined as far as compositions E and K are concerned.

For each of the compositions E and K, two experimentations are carried out; in one of these experimentations the amount applied is equal to 0.05% by weight with respect to the fertilizer (amount of dry matter of polymer and of surfactive agent corresponding to a proportion of 0.013% by weight with respect to the dry matter of the urea), the same way as in the preceding example, the said amount being 0.03% in the other experimentation (amount of dry matter of polymer and surfactive agent corresponding to a proportion of 0.0075% by weight with respect to the dry matter of the treated urea).

The results of the anticlumping treatment are determined in the same way as in example 2.

The values recorded as far as the hardness of the clumps is concerned are:

|  | Hardness for an amount of | |
| --- | --- | --- |
|  | 0.03% | 0.05% |
| Composition E | 15 N | 10 N |
| Composition K | 8 N | 4 N |

The examination of these results shows that the effect of the treatment remains excellent even at the very low proportion of 0.03%.

EXAMPLE 5

Four compositions, respectively L, M, N and P, according to the invention are prepared.

Compositions L and M are different from compositions E and K respectively by the fact that the neutralizing agent is monoethanolamine or MEA. Consequently, these compositions are identified as follows:

Composition L: PVA/n-butyl-n-hexylphosphate of MEA (3/2)

Composition M: PVA/n-butyl-2-ethyl-hexylphosphate of MEA (3/2).

Composition N is characterized by the fact that the surfactive agent is a phosphoric ester acid of a polypropyleneglycol PPG having a molecular weight equal to 1000 and neutralized with $NH_4OH$; composition P is different from composition N by the fact that the neutralizing agent is MEA.

These two compositions are identified as follows:

Composition N: PVA/PPG phosphate of $NH_4$ (3/2)

Composition P: PVA/PG phosphate of MEA (3/2).

The anticlumping results are determined by proceeding as indicated in example 1 after having applied to prilled urea the same amount of each of the tested compositions, i.e. the same proportion of dry matter of polymer and of surfactive agent with respect to the dry matter of the urea as in example 1.

For sake of comparison and under the same conditions, anticlumping results obtained using a product available on the marked and sold under the trademark "URESOFT 150" by the Company Kao Soap (essentially based on sodium laurylsulfate) were determined.

The results of the measurements of the hardness of the clumps (same conditions as in example 1) are collected in table I.

TABLE I

| Anticlumping composition | Hardness of the clumps in N |
| --- | --- |
| URESOFT 150 | 30 |
| E | 3 |
| L | 0 |
| K | 0 |
| M | 0 |
| N | 8 |
| P | 3 |
| Control | 120 |

The superiority of the compositions according to the invention clearly appears from these results.

We claim:

1. Anticlumping composition intended for fertilizer comprising an aqueous solution of at least one surfactive agent and at least one high molecular weight polymer soluble in the aqueous solution and being selected from the group consisting of polyvinyl alcohols, polyvinylpyrrolidones, urea-formaldehyde resin, polyethyleneglycol, the derivatives of cellulose among which carboxymethylcellulose, polycarboxylic acids and their salts, polyacrylamides, polyvinylsulfonic acid and its salts, polyvinylmethylic ether, copolymers of maleic acid and of acrylic acid, copolymers of methacrylic acid or of acrylamide, ether-methylvinylic copolymers, copolymers of vinylpyrrolidone and of vinyl acetate or acrylamide, wherein the surfactive agent is selected from the group consisting of alkylphosphoric acids and ethoxylated alkylphosphoric acids.

2. Anticlumping composition according to claim 1, wherein the alkylphosphoric acid or ethoxylated alkylphosphoric acid is used in the form of an alkaline metal salt, an ammonium, amine or alkanolamine salt.

3. Anticlumping composition according to claim 1, wherein the weight ratio between the polymer and the surfactive agent is from 1/10 to 10/1.

4. Anticlumping composition according to claim 1, wherein the weight ratio between the polymer and the surfactive agent is from 1/10 to 5/1.

5. Anticlumping composition according to claim 1, wherein the weight ratio between the polymer and the surfactive agent is from 1/10 to 1/2.

6. Anticlumping composition according to claim 1, wherein the alkylphosphoric acids and ethoxylated alkylphosphoric acids are in the form of mixtures of mono- and diesters.

7. Anticlumping composition according to claim 1, wherein the surfactive agent is selected from the group consisting of ammonium n-hexylphosphate, ammonium n-butyl-n-hexylphosphate, sodium n-hexylphosphate, monoethanolamine n-hexylphosphate, n-butyl-n-hexylphosphate of MEA and n-butyl-n-ethyl-hexylphosphate of MEA.

8. Fertilizer of the group consisting of urea, ammonium nitrate, sulfate, chloride and phosphates, potassium chloride, calcium superphosphate and mixtures of these products, the said fertilizer comprising on its constitutive particles a coating consisting of the constituents of an anticlumping composition comprising an aqueous solution of at least one surfactive agent and at least one high molecular weight polymer soluble in the aqueous solution and being selected from the group consisting of polyvinyl alcohols, polyvinylpyrrolidones, urea-formaldehyde resin, poly-ethyleneglycol, the derivatives of cellulose among which carboxymethylcellulose, polycarboxylic acids and their salts, polyacrylamides, polyvinylsulfonic acid and its salts, polyvinylmethylic ether, copolymers of maleic acid and of acrylic acid, copolymers of methacrylic acid or of acrylamide, ether-methylvinylic copolymers, copolymers of vinylpyrrolidone and of vinyl acetate or acrylamide, the said surfactant agent is selected from the group consisting of alkylphosphoric acids and ethoxylated alkylphosphoric acids.

* * * * *